F. CRIEST.
TOY.
APPLICATION FILED APR. 13, 1916.
1,201,941.
Patented Oct. 17, 1916.
2 SHEETS—SHEET 1.
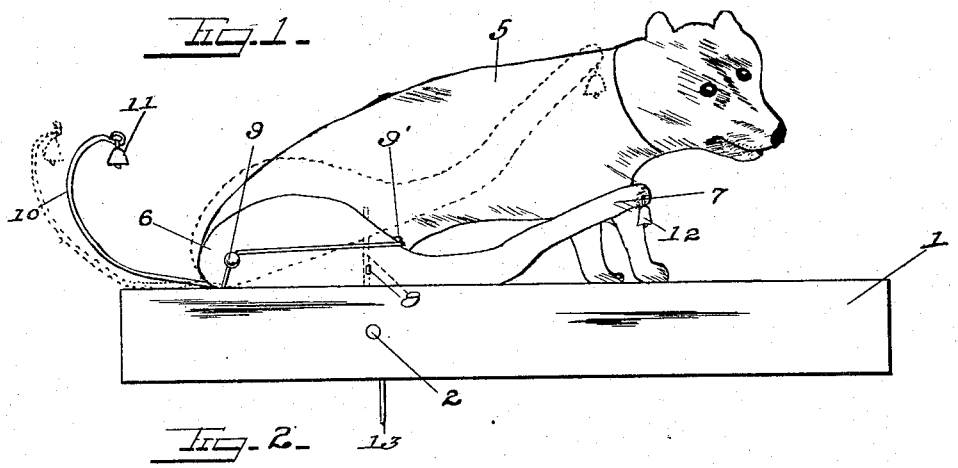
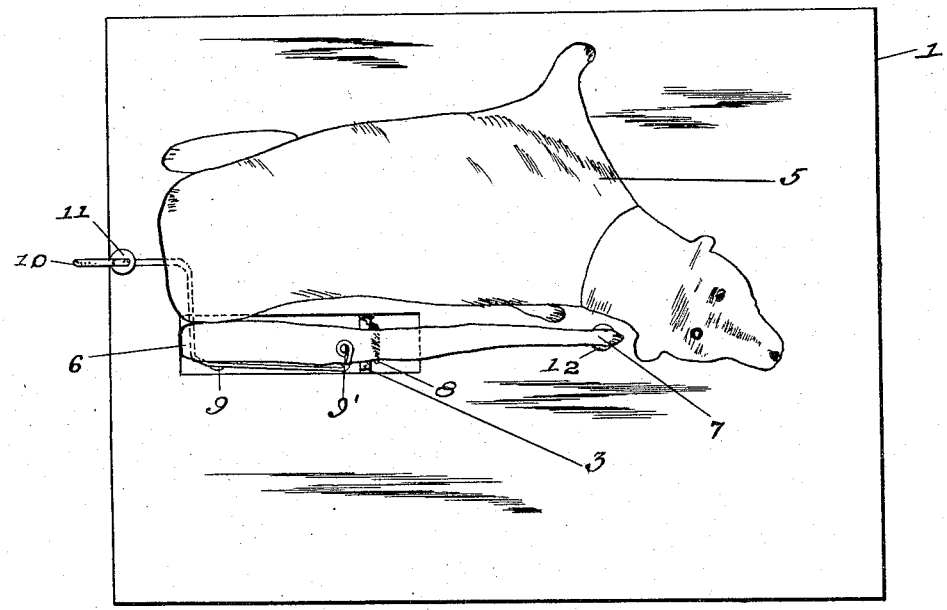
Frank Criest
Inventor
Witnesses
Ira M. Jones
By 
Attorney

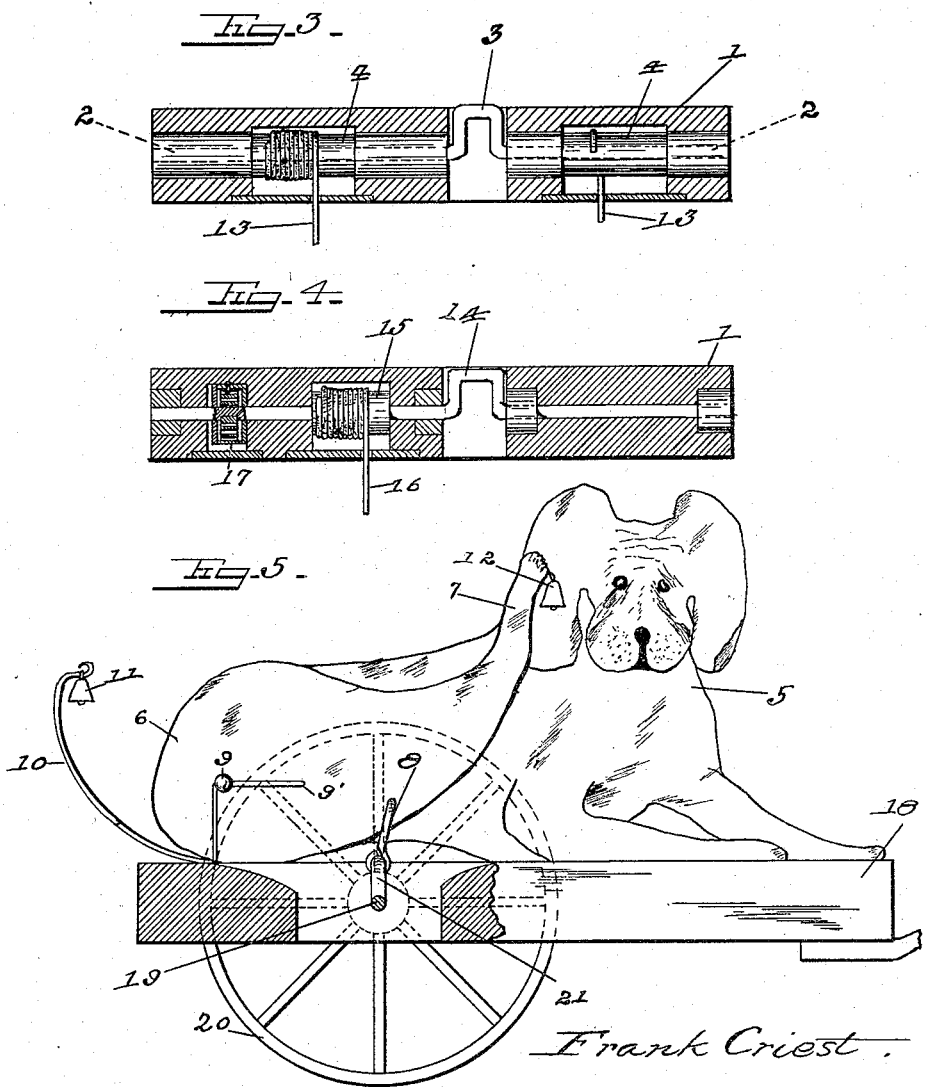

UNITED STATES PATENT OFFICE.

FRANK CRIEST, OF SHARPSVILLE, PENNSYLVANIA.

TOY.

1,201,941.    Specification of Letters Patent.    Patented Oct. 17, 1916.

Application filed April 13, 1916. Serial No. 90,825.

*To all whom it may concern:*

Be it known that I, FRANK CRIEST, a citizen of the United States, residing at Sharpsville, in the county of Mercer and State of Pennsylvania, have invented certain new and useful Improvements in Toys, of which the following is a specification.

My invention relates to improvements in mechanical animal toys and is particularly designed to represent the figure of a dog in the attitude and with its hind leg in position to scratch its head, wag its tail, and sound a bell, thus giving it a lifelike appearance, and by reason of the bell calling attention to its movements, thus providing a highly amusing and interesting toy of this character.

Another object of my invention is the provision of a toy which will simulate a dog scratching its head, wagging its tail and sounding a bell, the toy being lifelike in its appearance and action, and being capable of production at a very small cost, to render it amusing, interesting and very desirable.

The invention further consists of a toy embodying novel features of construction, combination and arrangement of parts, substantially as shown, described and claimed herein, it being understood that any change may be made in the construction that falls within the scope of the invention.

Figure 1 represents a side elevation of a mechanical toy constructed in accordance with and embodying my invention. Fig. 2 represents a plan view of the toy. Fig. 3 represents a rear end sectional view of the base or support showing the operating mechanism in elevation. Fig. 4 represents a view similar to Fig. 3 of a modified construction of my invention, and Fig. 5 represents a side elevation of another modification of my invention with the base partly in section to show the construction of the operating means.

Referring by numerals to the drawings, in which the same characters are used to denote like parts in all the views, the numeral 1 designates a base or support in which is mounted a shaft 2, formed with an intermediate crank 3, and also carrying near its end the drums 4. On the base is secured the figure 5, which preferably, for the purpose of my invention, represents a dog in the position the animal assumes when scratching its head, said figure having mounted thereon the inner enlarged end 6, formed with the leg 7, which projects upward and has its end located adjacent the head of the animal, said member being connected by a link 8, with the crank 3 of the shaft. Also connected with the leg member at 9 and 9', is the tail 10, which extends rearwardly and upwardly and preferably has secured to its extremity a bell 11, a bell 12, being also connected to the end of the leg member.

Upon each of the drums is wound in opposite directions the operating cords 13, which when drawn revolve upon the drum and rotate the shaft, the crank of which through its connection with the leg member moves said member quickly up and down, giving said member the appearance of scratching the head of the dog, such action of the crank on the shaft also moving the tail in unison with the leg member, as well as ringing the bells carried by the tail and leg member, thus giving to the figure a lifelike appearance and action.

In the modified form of my invention, shown in Fig. 4, the identical object or purpose is obtained, by using the crank-shaft 14, which is connected in the same manner with the leg member, but carries a drum 15, operated by cord 16, and provided with a coiled spring 17, for returning the drum to normal position, the leg and tail being moved both when the cord is unwound from the drum and when wound upon the drum by the action of the spring.

In the form of my invention shown in Fig. 5, the figure 5 is secured to a base 18, mounted on an axle 19, carrying wheels 20, said axle being formed with a crank 21, connected to the leg member as in the other forms of my invention, and providing a wheeled toy, which when drawn over the ground revolves the crank shaft, and it moves the leg and tail of the animal giving the same effect and action as in the other constructions of my toy.

From the foregoing description, taken in connection with the drawing, it will be apparent that I provide a toy which can be held in one hand and operated with the other, or which may be used as a wheeled toy, and which in either instance will give to the figure of the dog or other animal a lifelike appearance and action to insure a toy which will be highly amusing and interesting. It will also be understood that the toy comprises few parts and will not get out of order under hard usage, also that it can be produced at a very low figure and generally in every particular will prove very desirable and practical.

I claim:

1. A toy of the character described, consisting of a base or support, a figure mounted thereon, a pivoted member forming a leg and tail connected to the figure, a crank-shaft connected to said member to actuate said leg and tail, a drum on said shaft, and an operating cord on said drum to drive the shaft in one direction and means on the shaft for driving the shaft in reverse direction.

2. A toy of the character described, consisting of a base support, a figure mounted thereon, a pivoted member forming a leg and tail connected to the figure, a bell carried by said leg and tail, a crank-shaft connected to said member to actuate said leg and tail, a drum on said shaft, and an operating cord on said drum to drive the shaft in one direction and means on the shaft for driving the shaft in reverse direction.

3. A toy of the character described, consisting of a base support, a figure mounted thereon, a pivoted member forming a leg and tail connected to the figure, a crank-shaft mounted in said base support, a link connecting said crank-shaft and leg member, a drum on said crank-shaft, an operating cord adapted to be wound and unwound on said drum to move said member, and means for returning the shaft and rewinding the operating cord upon said drum.

4. A toy of the character described, consisting of a base support, a figure mounted thereon, a pivoted member forming a leg and tail connected to the figure, a crank-shaft mounted in said base support, a link connecting said crank-shaft and member, a drum on said crank-shaft, an operating cord adapted to be wound and rewound on said drum to move said member, and means for returning the shaft and rewinding the operating cord upon said drum, said means consisting of a coil spring mounted on said shaft having its inner end secured to the shaft and its outer end secured to said base support.

In testimony whereof I affix my signature in the presence of two witnesses.

FRANK CRIEST.

Witnesses:
GEO. R. DICKSON,
W. H. VAN CORY.

Copies of this patent may be obtained for five cents each, by addressing the "Commissioner of Patents, Washington, D. C."